United States Patent [19]
Thommes

[11] Patent Number: 5,947,668
[45] Date of Patent: Sep. 7, 1999

[54] SELF-RETAINING BOLT

[76] Inventor: Friedrich Thommes, 169 Rd., P.O. Box 202, Kingston, Canada, VOC 2SO

[21] Appl. No.: 09/143,458

[22] Filed: Aug. 31, 1998

[51] Int. Cl.$^6$ .............................. F16B 35/04; F16B 39/34
[52] U.S. Cl. ........................... 411/304; 411/418; 411/947
[58] Field of Search ..................... 411/303, 304, 411/324, 418, 419, 947

[56] References Cited

U.S. PATENT DOCUMENTS

| | | | |
|---|---|---|---|
| 546,173 | 9/1895 | Martin, Jr. | 411/944 X |
| 570,658 | 11/1896 | Bestgen | 411/419 X |
| 1,158,454 | 11/1915 | DeCamp | 411/947 |
| 1,638,165 | 8/1927 | Rau | 411/419 |
| 2,877,818 | 3/1959 | Johnson . | |
| 3,149,654 | 9/1964 | Podell | 411/304 |
| 3,203,041 | 8/1965 | Beuter et al. | 411/304 X |
| 3,552,257 | 1/1971 | Tanabe | 411/419 X |
| 3,561,516 | 2/1971 | Reddy . | |
| 3,894,467 | 7/1975 | Brescia . | |
| 4,759,671 | 7/1988 | Duran . | |
| 5,407,312 | 4/1995 | Terrizzi | 411/304 |

FOREIGN PATENT DOCUMENTS 1040083  8/1966  United Kingdom ................... 411/304

*Primary Examiner*—Neill Wilson
*Attorney, Agent, or Firm*—Patent & Trademark Services; Joseph H. McGlynn

[57] ABSTRACT

A self retaining fastener which comprises a threaded bolt with an hexagonal head and threaded shaft with a longitudinal groove formed therein. An arcuate spring member is secured in the groove and protrudes slightly outward from the threaded shaft of the bolt to provide frictional force against the inner surface of a bore. A further embodiment of the invention provides a threaded shaft cut into segments by one or more diametrical slots. The segmented portion of the shaft is biased outward to a diameter slightly greater than that of the unsegmented portion, providing resilient frictional force when inserted into an appropriately sized bore.

2 Claims, 1 Drawing Sheet

SELF-RETAINING BOLT

BACKGROUND OF THE INVENTION

The present invention relates generally to fasteners, and in particular to a self-retaining bolt assembly having superior means to resist loosening in a variety of applications.

DESCRIPTION OF THE PRIOR ART

In the machinist and construction trades, it is often necessary to have fasteners with means to resist the loosening that is commonly caused by shock, wear, and vibration. In response to this need, a number of self-securing fasteners have been developed. However, as discussed below, the prior art self-securing fasteners do not provide adequate means for secure attachment in various applications.

For example, U.S. Pat. No. 3,894,467 describes an expansion nail, having biased arm members that come to bear against the inside of a wall surface when the fastener is applied. While this fastener is suitable for wood or other surfaces that are amenable to the use of nails, it is useless for other applications.

U.S. Pat. No. 4,759,671 discloses a self-retaining bolt assembly with a indentation containing a biased locking mechanism. However, this invention is designed for use on aircraft and similar applications, wherein a nut is applied to the threaded shaft. It is thus unsuitable for applications where the attachment of a nut is impossible. Similarly, U.S. Pat. No. 3,561,516 discloses a safety bolt having a dog biased within a lateral passage. This invention is also limited in its potential application, since the locking dog must pass beyond the opposing side of a workpiece before the fastener secures itself.

U.S. Pat. No. 2,877,818 describes a self-retaining bolt with spring biased reaming plates. Aside from being complicated and relatively expensive to construct, this invention is adapted for applications where the bolt-receiving socket is to be formed with a counter bore. This invention is thus particularly designed for masonry application, and is unsuitable for use in machine construction and other applications.

Clearly, there remains a need in the art for a self-securing fastener that is useful in a variety of construction and machinist applications. In addition, there remains a need for a self-securing fastener with a securing means that is sufficiently resistant to shock and vibration. The present invention, described in detail below, overcomes the drawbacks of the prior art, and also affords additional advantages not provided by the self-securing fasteners heretofore disclosed.

SUMMARY OF THE INVENTION

The present invention provides a self-retaining bolt that is inexpensive, reliable, and adaptable for use in a variety of construction and machine applications. The invention comprises a bolt or screw having a head and a threaded shaft. In one embodiment of the invention, a longitudinal groove is formed along the threaded shaft. An outwardly biased, arcuate member is fitted securely into the slot, such that the arcuate member provides resilient frictional force against the bore into which the bolt is inserted. In this manner, the self-retaining bolt of the present invention resists the loosening that is occasioned by shock, vibration, and wear.

In a further embodiment of the present invention, one or more diametrical slots are cut or formed into the threaded shaft, said slots extending longitudinally from the distal end of the shaft to a point relatively close to the bolt head. The segmented portion of the shaft is slightly diametrically expanded as compared to the remainder of the shaft. The expanded portion of the shaft must be compressed somewhat when inserted or threaded into an appropriately sized bore, thus providing resilient frictional bias against the bore to resist loosening of the bolt.

Accordingly, it is an object of the present invention to provide an improved self-retaining fastener.

It is a further object of the present invention to provide an improved, self-retaining fastener that is inexpensive and convenient.

It is a further object of the present invention to provide an improved, self-retaining fastener that is suitable for a variety of applications.

It is a further object of the present invention to provide an improved, self-retaining fastener that is resistant to shock, vibration, and wear.

These and other objects and advantages of the present invention will become apparent from the detailed description below, when taken in conjunction with the annexed drawings.

DESCRIPTION OF THE PREFERRED EMBODIMENTS

Figure 1:
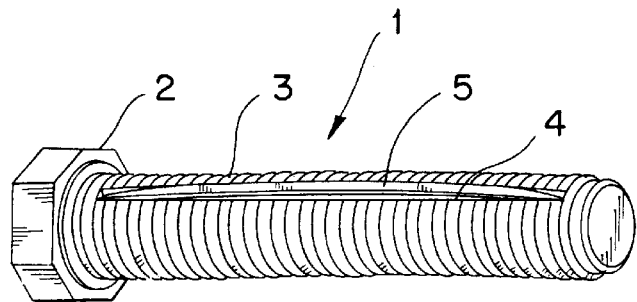
FIG. 1 shows a perspective view of one embodiment of the self-retaining bolt, comprising an outwardly biased arcuate member.
Figure 2:
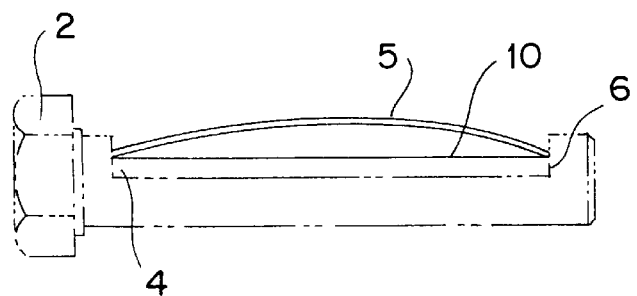
FIG. 2 shows a side view of the embodiment of the self-retaining bolt depicted in FIG. 1, with shadow lines depicting the bolt head and shaft.

Referring now to the drawings in greater detail, one embodiment of the self-retaining bolt 1 of the present invention is depicted in FIG. 1, wherein the self-retaining bolt 1 is shown comprising generally an hexagonal head 2 (although other shapes can be used), a threaded shaft, and a spring members. The self-retaining bolt 1 is preferably constructed from tempered, heat-resistant steel, although other materials may be used without departing from the scope of the invention. As shown in both FIGS. 1 and 2, the threaded shaft 3 of the bolt 1 has a longitudinal groove formed along one side thereof. As shown best inFIG. 2, showing the side view, the groove 4 is generally rectilinear, extending from a point near the hexagonal head 2 and terminating at an end portion 6 near the tip of the threaded member 3.

Spring member 5 is preferably constructed from a thin, planar strip of metal. As shown best in FIG. 2, spring member 5 is folded over at one end, forming an upper, arcuate portion 5 atop a lower, linear portion 10. The lower linear portion fits securely into the groove 4, while the upper arcuate portion of spring member 5 is biased outward somewhat from the threaded shaft 3. A slight space exists between the end portion 6 of the groove 4 and the end of the upper arcuate portion of the springs, such as to allow for compression of the spring 5 when the threaded shaft 3 is inserted into a bore. Upon insertion of the threaded shaft 3 into a bore (not shown), upper arcuate portion of the spring 5 is compressed, providing resilient frictional force against the inside of the bore to prevent loosening of the bolt 1.

Figure 3:
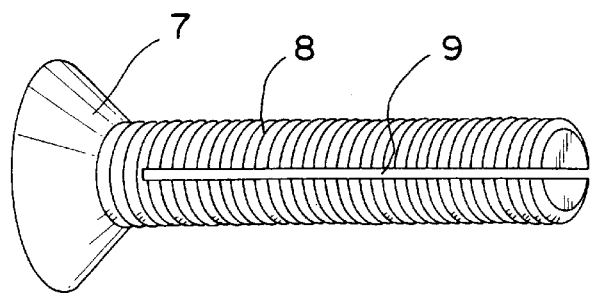
FIG. 3 shows a perspective view of a further embodiment of the self-retaining bolt of the present invention.
Figure 4:
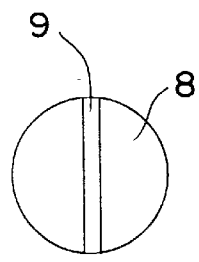
FIG. 4 shows a cross-sectional view of the shaft of the self-retaining bolt depicted in FIG. 3.

A further embodiment of the bolt 1 is depicted pictorially in FIG. 3, and cross sectionally in FIG. 4. As shown in FIG. 3, a screw is provided with a screw head 7 of any conventional shape, and a threaded shaft that is divided into segments 8 by a diametrical slot 9. Again, heat resistant steel or some similar material is the preferred construction material. It also is to be understood that although the embodiment of the invention shown in FIG. 3 is depicted with a screw head 7, other types of drive heads, such as a hexagonal head, can be used without departing from the scope of the invention.

The slot 9 extends from the tip of the threaded shaft segments 8 to a point relatively close to the screw head 7. Shaft segments 8 are biased apart, to a diameter slightly greater than that of the unsegmented portion of the shaft. Thus, when the shaft segments 8 are inserted into an appropriately sized bore, the compression of the segments 8 provides resilient frictional force against the inside of the bore to prevent loosening of the screw.

Figure 5:
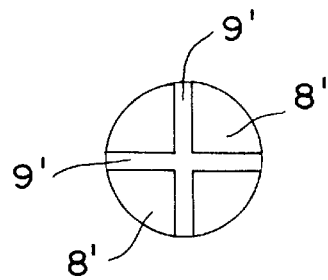
FIG. 5 shows a cross-sectional view similar to that shown in FIG. 4, with an additional diametrical slot formed in the shaft of the self-retaining bolt.

FIG. 5 shows a cross-sectional view wherein additional shaft segments 8' may be formed by additional slots 9'. The formation of additional slots serves to reduce the force necessary to insert the threaded shaft into a bore, which may be desirable for application to delicate items, such as eyewear or very small machinery.

The usefulness and advantages of the self-retaining bolt in its various embodiments may now be appreciated. The present invention provides a self-retaining fastener that is inexpensive, reliable, and durable. The self-retaining bolt 1 of the present invention may be used in virtually every application wherein a conventional bolt or screw would be used. In use, it greatly reduces the risk of bolt loosening due to shock, vibration, and wear. It thereby enhances the reliability, durability, and safety of machines, construction projects, and personal items.

Although the self-retaining bolt and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. A self retaining fastener comprising:
    a longitudinal member having a length, a longitudinal axis and a diameter,
    said longitudinal member having means for engaging a tool at one end,
    a slot extending parallel with said longitudinal axis,
    said slot extending along substantially the entire length of said longitudinal member,
    a resilient member inserted into said slot,
    said resilient member having a first portion extending into said slot and a second portion projecting out of said slot, and
    wherein said first portion of said resilient member is straight and said second portion of said resilient member is curved away from said slot.

2. The self retaining fastener as claimed in claim 1, wherein there are two or more slots in said longitudinal member.

* * * * *